Aug. 19, 1952 A. TOWNHILL 2,607,643
STRUT TYPE PISTON
Filed Jan. 14, 1949
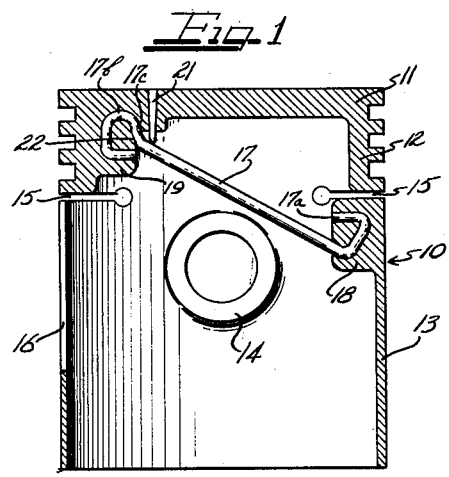
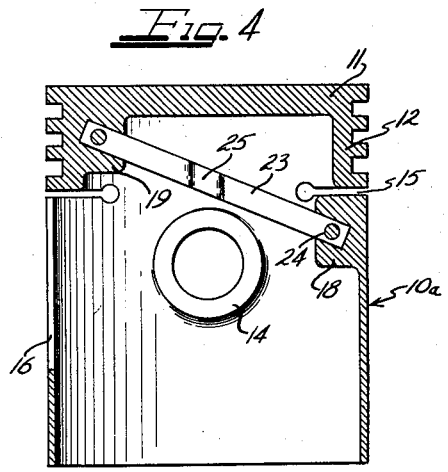
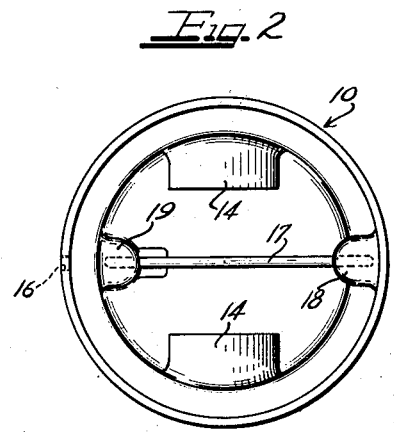
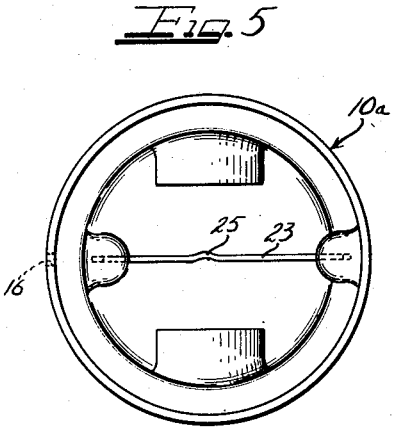
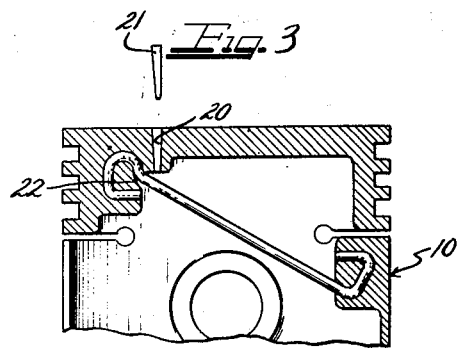
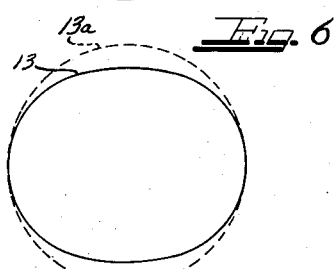
Inventor
ARTHUR TOWNHILL
by The Firm of Charlesworth Attys.

Patented Aug. 19, 1952

2,607,643

UNITED STATES PATENT OFFICE 2,607,643

STRUT TYPE PISTON

Arthur Townhill, Cleveland, Ohio, assignor to Thompson Products, Inc., Cleveland, Ohio, a corporation of Ohio Application January 14, 1949, Serial No. 70,915

7 Claims. (Cl. 309—13)

The present invention relates to a strut type piston for internal combustion engines and more particularly to a piston provided with a tensioned strut for controlling thermal expansion of the piston skirt at operating temperatures.

In the employment of pistons fabricated from light metals, such as aluminum, having relatively high thermal expansion coefficients, the thermal expansion of the piston during operation at elevated engine temperatures has caused operational failures and other difficulties. Many and various expedients have been proposed to control this expansion to values within the expansion limit of the material of the engine block in which the pistons operate. Pistons employing such expedients, however, have proved generally unsatisfactory due to their complexity, difficulty of manufacture, and failure to conform to the rigorous standards which must be maintained.

The present invention now provides an improved piston having a circular head and a pin-boss equipped slotted oval-shaped skirt depending from the head and connected thereto only on the pin boss sides in which the expansion of the non-slotted side of the skirt is controlled through a rigid tensioned strut connection from the skirt to a diametrically opposite portion of the piston head. The strut member is tensioned by deformation after it is anchored to the piston. The major axis of the oval skirt lies in a plane transverse to the axis of the wrist pin bosses and the slot extends through one end of the major axis portion of the skirt. Expansion of the piston skirt can occur along both axes of the skirt to maintain the thrust faces of the skirt, which are normal to the wrist pin boss faces, against a cylinder wall of the engine, without scoring the thrust faces.

Since an expansion control strut must have a lower coefficient of expansion than the piston, and since the strut is preferably cast integrally with the piston, shrinkage of the casting upon cooling will place the strut under compression, thereby stressing the piston when cool and having no restraining action on the piston when heated.

In order to eliminate stress within the piston caused by compression of the strut, and to render the strut effective as an expansion control member, the strut is structurally shaped so that it can be placed under tension following casting of the piston by deformation of the strut in any desired manner.

It is, therefore, an important object of the present invention to provide an improved strut-type piston construction in which the strut is placed under initial tension to control piston expansion characteristics.

Another object of the present invention is to provide an aluminum piston with a tensioned steel strut for controlling expansion of the piston thrust faces.

It is a further object of this invention to provide an improved strut-type piston having a head portion, a pin boss-equipped oval skirt portion depending from the head and having opposed slotted and unslotted thrust faces normal to the pin bosses, and a tensioned control strut of substantially lower thermal expansion characteristics than the piston extending from the unslotted thrust face to a diametrically opposed portion of the piston head.

Other and further objects of this invention will be apparent from the disclosures in the specification and the accompanying drawings.

On the drawings:

Figure 1 is a vertical sectional view, taken transversely to the axis of the wrist pin bosses, of a piston construction of the present invention;

Figure 2 is a bottom plan view of the piston of Figure 1;

Figure 3 is a fragmentary cross-sectional view similar to Figure 1 showing a manner in which the strut is tensioned;

Figure 4 is a cross-sectional view, similar to Figure 1, illustrating a modified form of a piston of the present invention;

Figure 5 is a bottom plan view further illustrating the piston of Figure 4; and

Figure 6 is a schematic outline view illustrating in exaggerated form the normal shape of the skirt of the piston of Figures 1 and 4, and the shape assumed when heated to operating temperatures.

On the drawings:

In Figures 1-3 inclusive, reference numeral 10 refers generally to a piston of the present invention. As illustrated, the piston may suitably be a one-piece strut-type piston which is fabricated by the casting of light metal, such as aluminum, magnesium, or alloys thereof in automatic molding machinery. Piston 10 has a head portion 11 formed with a depending annular piston ring flange 12 formed integrally therewith and a hollow skirt 13 integrally secured to the bottom of flange 12.

The skirt 13 carries diametrically opposed wrist pin bosses 14 adapted to receive the wrist pins of a connecting rod (not shown). As shown in Figure 6, the skirt 13 is oval in shape, with its major axis normal to the axis of wrist pin bosses 14.

The piston 10 is provided with diametrically opposed arcuate slots 15 separating the depending flange 12 and the skirt 13 to separate the skirt 13 from the head 11 except on the sides of the skirt containing the wrist pin bosses 14. Thus, heat flow from head 11 to skirt 13 is concentrated in the vicinity of the wrist pin bosses 14 to increase the heat transfer efficiency of the piston. A longitudinal expansion slot 16, bisecting one of the slots 15, is provided to permit expansion and contraction of the skirt.

In accordance with the present invention, an expansion control for the opposed thrust faces of the skirt 13 is provided by an expansion control strut 17 which is incorporated in the piston structure. The strut 17 has its opposed ends respectively anchored in a protuberance 18 formed in the non-slotted thrust faces of skirt portion 13 adjacent slot 15 and opposite slot 16 and in a second protuberance 19 formed integrally in the diametrically opposed portion of the piston head 11. The strut 17 illustrated in Figures 1 and 2 is in the form of a rigid steel or iron wire or rod having deformed end portions 17a and 17b embedded in the protuberances 18 and 19 respectively. The strut 17 is preferably embedded in protuberances 18 and 19 during the initial casting of the entire piston so as to be integrally cast therein and may be conveniently seated in a slot-like recess in the core of a permanent mold for forming the piston. Since the wire or rod as shown in Figures 1 to 3 is quite thin, the core slot of the mold receiving the wire or rod can be very narrow and any fin of metal that might be formed in the core slot of the mold between the wire and piston head will be very thin and easily dislodged. Alternately, of course, the slot can be filled with an asbestos filler or the like above the wire, in which event no fin will be formed.

Due to thermal expansion upon heating and shrinkage upon cooling, both the piston and the strut will be contracted during solidification of the cast metal. However, since the thermal expansion coefficients of the different metals vary, the piston will contract to a considerably greater extent than the strut. Thus, since the strut is integrally cast with the piston, the greater contraction of the piston places the strut under compressive stress. If this stress as originally applied to both the piston and the strut were not relieved, the piston might eventually be subject to mechanical failure. The present invention now provides means for relieving the stresses created during casting by subjecting the strut to tension in order that a subsequent expansion of the skirt upon later subjection of the piston to engine operating temperature may be controlled. This may suitably be accomplished by the means illustrated in Figures 1–3.

As particularly shown in Figure 3, the piston head 11 is provided with a tapering aperture 20 extending into the interior of piston 10 in direct alignment with the strut 17. A tapered wedge pin 21 is driven into aperture 20 against the upper end of strut 17 as shown in Figure 1. The pin deforms a local portion of the strut to form a kink 17c against an inclined shoulder 22 on the side wall of protuberance 19. The pin 21 is wedge locked in the hole 20 and can be welded in position if desired.

By thus deforming the strut 17, its overall length is reduced so that the compressive stress applied thereto is relieved and the strut 17 is placed under tension. The kink 17c in the strut does not weaken it, since the shoulder 22 stops the deformation before any harmful degree of bending occurs.

In the second embodiment of the invention, shown in Figures 4 and 5, piston body 10a is identical with the piston body illustrated in Figures 1–3 and the same reference numerals are used to identify identical parts. The body 10a, however, has a modified form of strut 23 composed of a thin, flat strip of metal having expansion characteristics considerably different from those of the piston 10. The ends of strip 23 are apertured as at 24 with the apertured ends extending into the bosses 18 and 19 as hereinbefore described. The apertures 24 serve to firmly bond the strip following the casting operation as hereinbefore described in connection with strut 17. The broad flat faces of the strip 23 are parallel with the longitudinal axis of the piston body 10a and the strip is quite thin, so that the strip-receiving core slot of the mold can be very narrow and any fin formed thereon during the casting operation will be easily removable.

Following the casting operation, the strip 23 is locally kinked or deformed as at 25 by means of a pliers or the like to relieve the compressive stress generated upon solidification of the casting.

Thus it will be seen that the present invention provides a tensioned strut for controlling the thermal expansion characteristics of the thrust faces of a piston skirt. The manner in which this expansion is controlled will be readily understood from Figure 6, in which the solid outline indicated by reference numeral 13 represents the ellipsoidal cross-sectional contour of the piston skirt at atmospheric conditions. When subjected to engine operating conditions, the piston skirt undergoes thermal expansion and this expansion along the major axis, i. e., normal to the axis of wrist pin bosses 14, is constrained by the strut member 17 or 23 as hereinbefore described, with substantially all of the thermal expansion taking place along the minor skirt axis coinciding with the axis of the wrist pin bosses 14. Thus, the skirt 13 is expanded to a nearly circular cross-sectional contour as shown in dotted lines indicated by reference numeral 13a of Figure 6.

The expansion of piston skirt 13 may be readily controlled over the normal range of operating temperatures encountered in internal combustion engines, and, since very little expansion of the piston skirt occurs along the direction of its major axis, very accurate clearance conditions can be maintained between the piston and its cylinder.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A piston comprising a metal piston body composed of metal having a high coefficient of expansion and a metal strut composed of metal having a lower coefficient of expansion, said body having a head portion with a peripheral piston ring flange and a pin boss-equipped skirt portion depending from said flange and attached thereto only on the sides thereof containing the pin bosses forming arcuate slots between the head and the skirt, said skirt being oval in a transverse plane thereof with a major axis normal to the wrist pin axis, said skirt having an axial slot therein at one end of the major axis thereof with said axial slot opening into one of said arcuate slots, said strut having one end anchored in the skirt at the other end of the major axis thereof and the other end anchored to a diametrically opposed portion of the head, and a localized kink in the strut placing the strut under tension to control expansion of the skirt from the head.

2. A piston comprising a body having a head portion, and an integral hollow skirt having opposed wrist pin bosses, said skirt being of generally oval configuration with the major axis thereof disposed transversely to the axis of the wrist pins, means for concentrating heat flow from said head portion through said skirt in the vicinity of said wrist pin bosses, a slot in said skirt disposed along said major axis for allowing for expansion of said skirt, and an expansion control strut having its ends anchored in said head portion and said skirt portion respectively, the strut being placed under initial tension and extending transversely across the hollow interior of the skirt from that portion of said skirt opposite said slot to a diametrically opposed portion of said head, said strut serving to restrain expansion of said skirt along its major axis.

3. A piston comprising a head portion, an integral depending hollow skirt thereon and having opposed wrist pin bosses, said skirt being of generally ellipsoidal configuration with the major axis thereof disposed transversely to the wrist pin bosses, the skirt having a slot formed therein aligned with said major axis, an elongated strut imbedded in said piston to control thermal expansion of said skirt, said strut extending transversely across the interior of said skirt in the plane of the major axis of the skirt from the skirt portion opposite said slot to the diametrically opposed portion of said head, and means on said head portion extending therefrom into contact with said strut adjacent its point of attachment to said head to transversely deform said strut and thereby place said head portion and skirt under tension.

4. A piston comprising a head portion, an integral depending hollow skirt having opposed wrist pin bosses, said skirt being of generally oval configuration with the major axis thereof disposed transversely to said wrist pin axis, said skirt being slotted on one side in line with its major axis, means for concentrating heat flow from said head portion to said skirt in the vicinity of said wrist pin bosses, an expansion rod having deformed end portions embedded in said head portion and said skirt respectively, and a pin carried by and extending through said head portion into wedged contact with said rod to locally deform said rod under transverse tension, said rod extending across the interior of said skirt from that skirt portion opposite said slot to the diametrically opposed portion of said head to prevent substantial thermal expansion of said skirt along its major axis.

5. A strut type piston having a head portion, a skirt portion, and a strut spanning the interior of the skirt portion with one end anchored to the skirt and the other end anchored to a diametrically opposed portion of the head, a pin depending from said head portion against said strut, and a kink in said strut adjacent said pin placing said strut under tension.

6. A strut type piston having a head portion, a skirt portion, and a strut spanning the interior of the skirt portion with one end anchored to the skirt and the other end anchored to a diametrically opposed portion of the head, said strut being a flat metal band having the broad faces thereof parallel with the longitudinal axis of the piston, and a kinked portion intermediate the ends of said band placing said strut under tension.

7. A strut-type piston having a head portion, a skirt portion, a strut spanning the interior of the skirt portion with one end anchored to the skirt and the other end anchored to a diametrically opposed portion of the head, and a pin extending through said head into engagement with that portion of said strut adjacent its point of attachment to said head to locally deform said strut away from said head portion, thereby placing said strut under an initial tension resisting subsequent thermal expansion of that skirt portion anchored to said strut.

ARTHUR TOWNHILL.

REFERENCES CITED

The following references are of record in the file of this patent:

UNITED STATES PATENTS

| Number | Name | Date |
| --- | --- | --- |
| 1,465,144 | Nelson | Aug. 14, 1923 |
| 1,730,120 | Jardine | Oct. 1, 1929 |
| 2,240,967 | Venner et al. | May 6, 1941 |
| 2,262,132 | Berry | Nov. 11, 1941 |
| 2,284,152 | Knocke | May 26, 1942 |
| 2,373,518 | Townhill | Apr. 10, 1945 |